(12) United States Patent
Demay

(10) Patent No.: US 9,475,540 B1
(45) Date of Patent: Oct. 25, 2016

(54) HANDLEBAR ATTACHMENT FOR HYBRID BICYCLES

(71) Applicant: John Gregory Demay, Lincoln, NE (US)

(72) Inventor: John Gregory Demay, Lincoln, NE (US)

( * ) Notice: Subject to any disclaimer, the term of this patent is extended or adjusted under 35 U.S.C. 154(b) by 0 days.

(21) Appl. No.: 14/880,057

(22) Filed: Oct. 9, 2015

Related U.S. Application Data

(60) Provisional application No. 62/062,707, filed on Oct. 10, 2014.

(51) Int. Cl.
*B62K 21/12* (2006.01)

(52) U.S. Cl.
CPC .................................. *B62K 21/125* (2013.01)

(58) Field of Classification Search
CPC .... B62K 11/14; B62K 21/12; B62K 21/125; B25G 1/102; Y10T 74/2078; Y10T 74/20822; Y10T 74/20828
See application file for complete search history.

(56) References Cited

U.S. PATENT DOCUMENTS

| | | | | |
|---|---|---|---|---|
| 5,033,325 A | * | 7/1991 | Giard, Jr. | B62K 21/125 280/278 |
| 5,145,210 A | * | 9/1992 | Lennon | B62K 21/125 280/261 |
| 5,154,094 A | * | 10/1992 | Klieber | B62K 21/125 280/261 |
| 5,154,095 A | * | 10/1992 | Giard, Jr. | B62K 21/125 74/551.1 |
| 5,163,339 A | * | 11/1992 | Giard, Jr. | B62K 21/125 403/374.4 |
| 5,235,872 A | * | 8/1993 | Giard, Jr. | B62K 21/125 248/118 |
| 5,315,895 A | | 5/1994 | Kattus et al. | |
| 5,353,663 A | * | 10/1994 | Samuelson | B62H 5/00 280/288.4 |
| 5,429,013 A | * | 7/1995 | Taylor | B62K 21/125 74/551.1 |
| 6,564,673 B1 | * | 5/2003 | Kilmer | B62K 21/125 74/551.1 |
| 7,143,662 B2 | * | 12/2006 | Hobson, Jr. | B62K 11/14 74/551.3 |
| 8,359,713 B1 | | 1/2013 | Chen | |
| 2002/0108465 A1 | | 8/2002 | Rocket | |
| 2010/0186545 A1 | * | 7/2010 | Ray | B62K 21/125 74/551.8 |
| 2013/0220066 A1 | | 8/2013 | Huang | |

* cited by examiner

*Primary Examiner* — Adam D Rogers
(74) *Attorney, Agent, or Firm* — Plager Schack LLP

(57) ABSTRACT

A handlebar attachment for use with an existing handlebar of a bicycle is provided. The handlebar attachment includes a curvature to provide a user with different hand placement positions to enhance rider comfort and safety. The handlebar attachment includes a bar member pivotably mounted to the existing handlebar of the bicycle, the bar member having a pair of symmetric halves continuously connected together, each symmetric half of the pair of symmetric halves having a plurality of bent sections continuously connected together. The bar member is designed to pivotably adjust relative to the existing handlebar to one of a plurality of locking positions to permit hands of the user to rest on any of the plurality of bent sections of the symmetric halves.

7 Claims, 4 Drawing Sheets

HANDLEBAR ATTACHMENT FOR HYBRID BICYCLES

RELATED APPLICATION

The application claims priority to provisional patent application U.S. Ser. No. 62/062,707 filed on Oct. 10, 2014, the entire contents of which is herein incorporated by reference.

BACKGROUND

The embodiments herein relate generally to handlebar attachments for bicycles.

Hybrid bicycles have flat handlebars that enable riders to control the direction of the bicycles when in motion. In many instances, the existing flat handlebar does not suit the rider's riding style and/or size. For example, the existing flat handlebar may not be correctly positioned to enable the rider to lean forward in a more aerodynamic position or stand up to maintain a more neutrally aligned back position that is more visible to oncoming traffic. In addition, the existing flat handlebar may be positioned too far away for a rider with small arms, which makes it difficult for the rider to operate the bike safely and/or comfortably.

Several existing handlebar attachments exist as disclosed in U.S. Patent Application Publications 2013/0220066 and 2002/0108465, U.S. Pat. Nos. 8,359,713 and 5,315,895. These handlebar attachments comprise at least one auxiliary bar that is attached to an existing bicycle handlebar. However, these handlebar attachments are limited in their range of adjustability and/or hand placement options. Therefore, these handlebar attachments do not adequately suit users who seek different riding styles.

As such, there is a need in the industry for a handlebar attachment for use with an existing bicycle handlebar that addresses the limitations of the prior art, which provides greater hand placement options for the rider.

SUMMARY

A handlebar attachment for use with an existing handlebar of a bicycle is provided. The handlebar attachment comprises a curvature to provide a user with different hand placement positions to enhance rider comfort and safety. The handlebar attachment comprises a bar member pivotably mounted to the existing handlebar of the bicycle, the bar member comprising a pair of symmetric halves continuously connected together, each symmetric half of the pair of symmetric halves comprising a plurality of bent sections continuously connected together, wherein the bar member is configured to pivotably adjust relative to the existing handlebar to one of a plurality of locking positions to permit hands of the user to rest on any of the plurality of bent sections of the symmetric halves, thereby enhancing rider comfort and safety. In certain embodiments of the invention, each symmetric half comprises a first bent section continuously connected to a second bent section continuously connected to a third bent section continuously connected to a fourth bent section.

BRIEF DESCRIPTION OF THE FIGURES

The detailed description of some embodiments of the invention will be made below with reference to the accompanying figures, wherein the figures disclose one or more embodiments of the present invention.

DETAILED DESCRIPTION OF CERTAIN EMBODIMENTS

Figure 1:
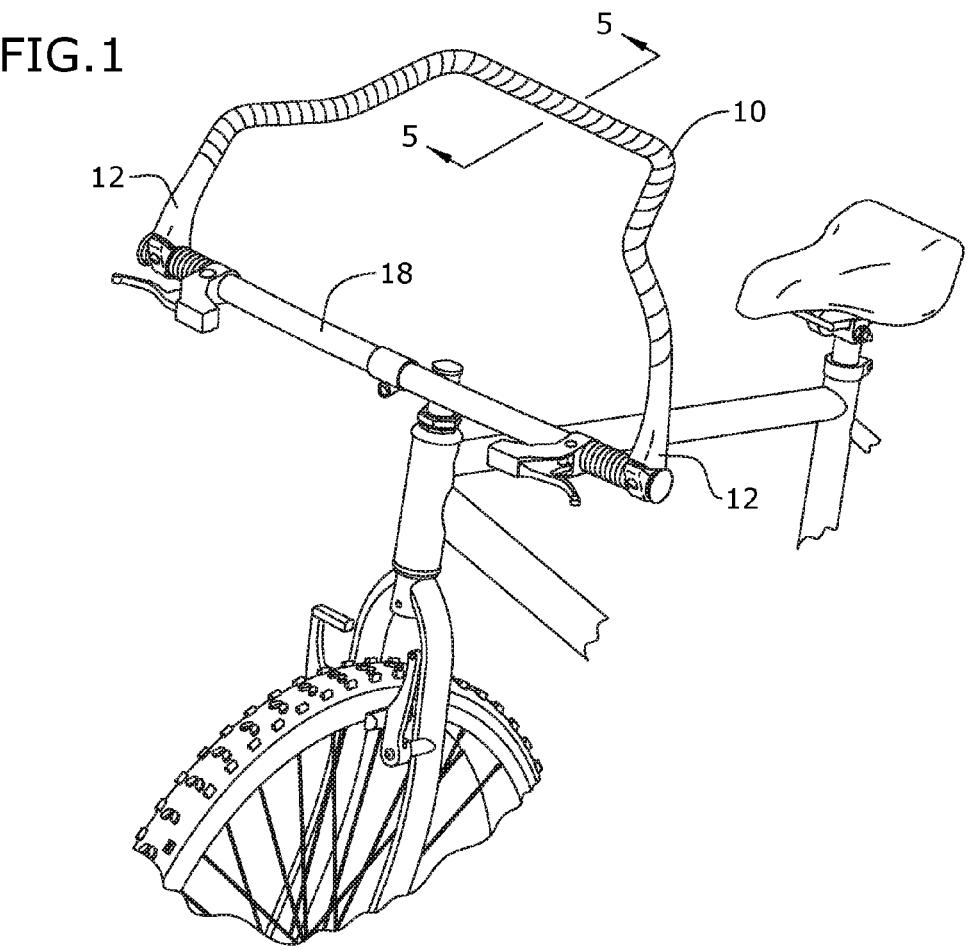
FIG. 1 depicts a perspective view of certain embodiments of the handlebar attachment shown in use.
Figure 2:
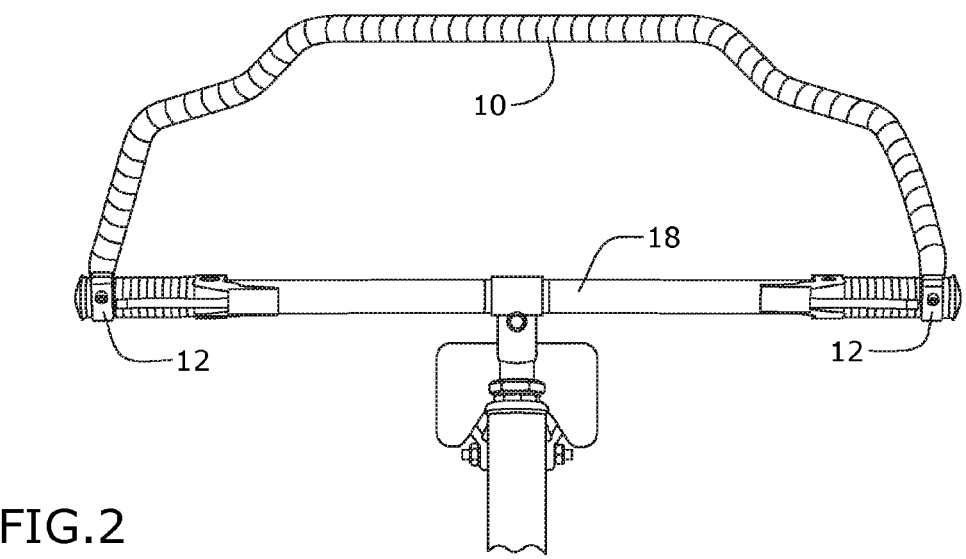
FIG. 2 depicts a front view of certain embodiments of the handlebar attachment.
Figure 3:
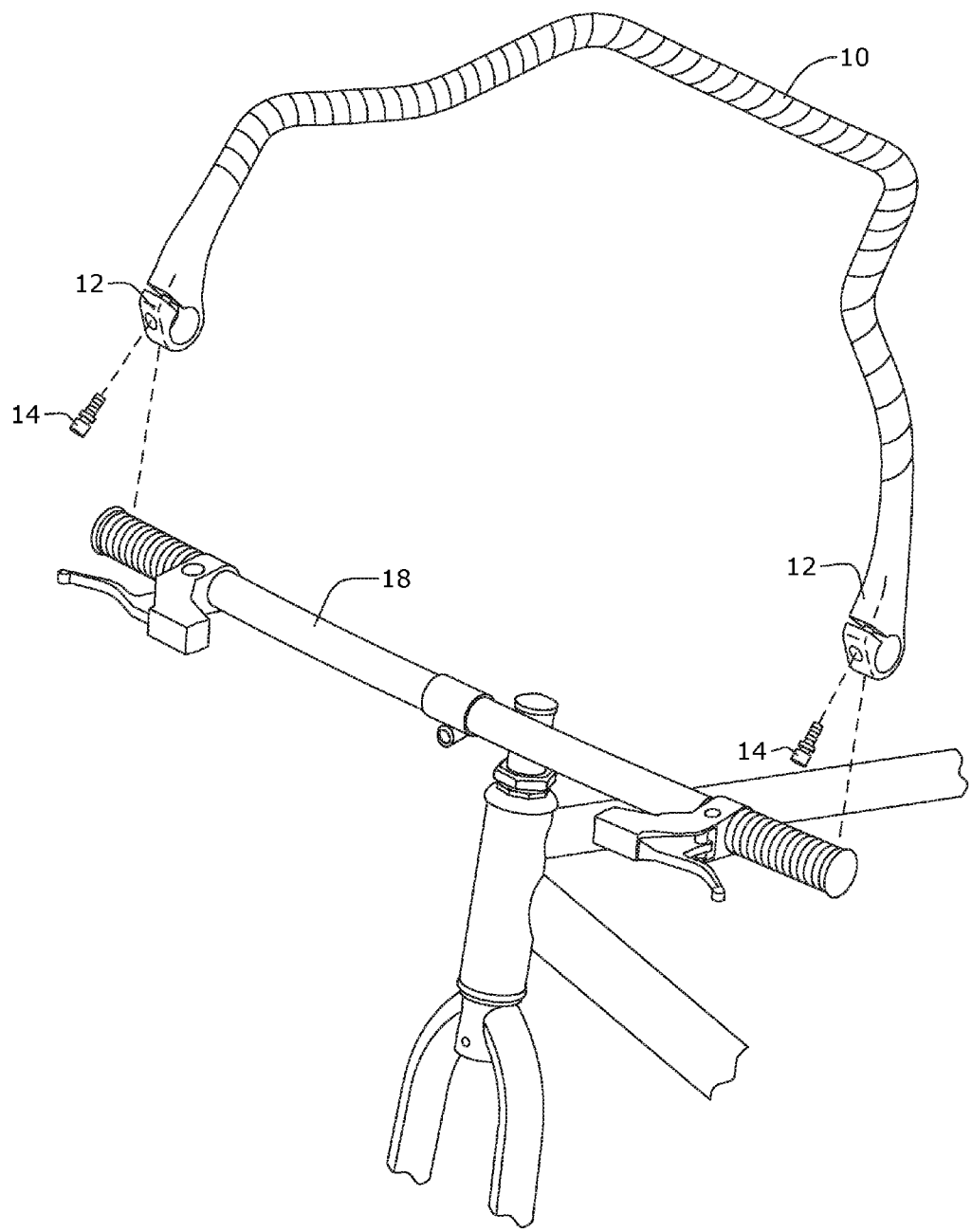
FIG. 3 depicts an exploded view of certain embodiments of the handlebar attachment.

As depicted in FIGS. 1-3, handlebar attachment 10 is configured to be secured to flat handlebar 18 of a bicycle. This provides a user (not shown) with different hand placement positions throughout the attachment, which enhances user safety and comfort when operating the bicycle. Handlebar attachment 10 also is configured to pivotably adjust to one of a plurality of positions to permit the user to ride the bicycle in different positions, i.e., standing up, leaning forward or leaning backward. In a preferred embodiment, the bicycle is a hybrid bicycle. However, any alternative type of bicycle may be used instead.

Handlebar attachment 10 preferably is a tubular member made from 6061 aluminum with an approximate diameter of ⅞". Handlebar attachment 10 comprises a pair of clamps 12 on the ends that are affixed to opposing end portions of flat handlebar 18. Flat handlebar 18 is typically 23-28 inches in length, but may vary in dimensions. In one embodiment of the invention, each clamp 12 is secured to an end of handlebar attachment 10 by inserting a short tube therein and using a pop riveting process. Bolts 14 are used to secure clamps 12 to flat handlebar 18. However, in alternative embodiments, other mechanical fasteners may be used instead such as brackets, other bolts, washers, nuts, or the like.

Figure 4:
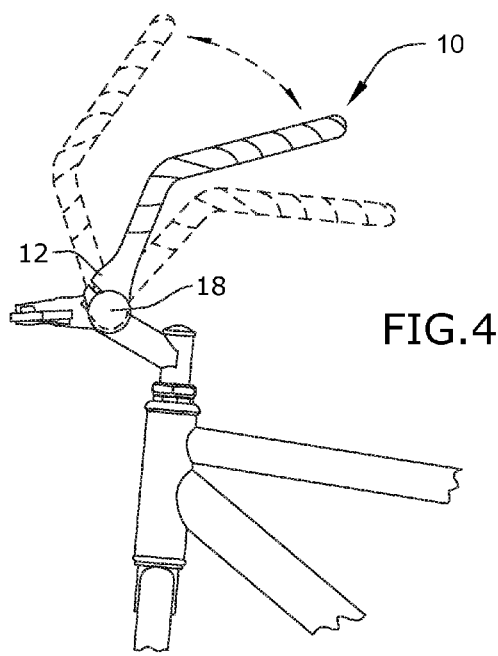
FIG. 4 depicts a side view of certain embodiments of the handlebar attachment shown in use illustrating a plurality of locking positions.
Figure 5:
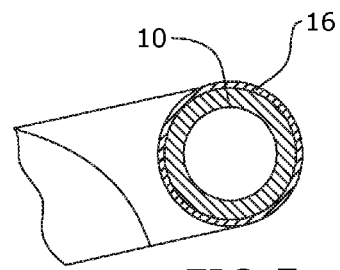
FIG. 5 depicts a section view of certain embodiments of the handlebar attachment, taken along line 5-5 in FIG. 1.

As depicted in FIG. 4, handlebar attachment 10 can be pivotably adjusted to one of a plurality of positions within an arcuate path. Bolts 14 are loosened to permit handlebar attachment 10 to be adjusted to the desired position. Once the desired position is achieved, bolts 14 are tightened to lock handlebar attachment 10 in the desired position. In one embodiment of the invention, tape 16 is wrapped around the outer surface of handlebar attachment 10 as depicted in FIG. 5. This enhances the user's grip on handlebar attachment 10.

It shall be appreciated that riders will benefit from adjusting handlebar attachment 10 to different positions to accommodate riders of different sizes, ages and riding styles. For example, handlebar attachment 10 may be adjusted to a generally upright position to permit the rider to stand up and maintain a neutrally aligned back. By placing his/her hands on handlebar attachment 10 to support the body, the rider can easily pedal and maneuver the bicycle as needed. In this configuration, the rider's body is more visible to oncoming traffic, which enhances rider safety. In an alternative configuration, handlebar attachment 10 can be pivotably adjusted to a forward position (not shown) away from the seated rider. This permits the rider to achieve a more aerodynamic position by leaning forward and grabbing handlebar attachment 10, which is placed in front of flat handlebar 18. In an alternative configuration, handlebar attachment 10 can be pivotably adjusted to a backward position (not shown) toward the seated rider. This is advantageous for smaller riders who may not have arms long enough to grab flat handlebar 18 of the bicycle. Instead, the rider can grab any portions of handlebar attachment 10 with his/her hands.

Figure 6:
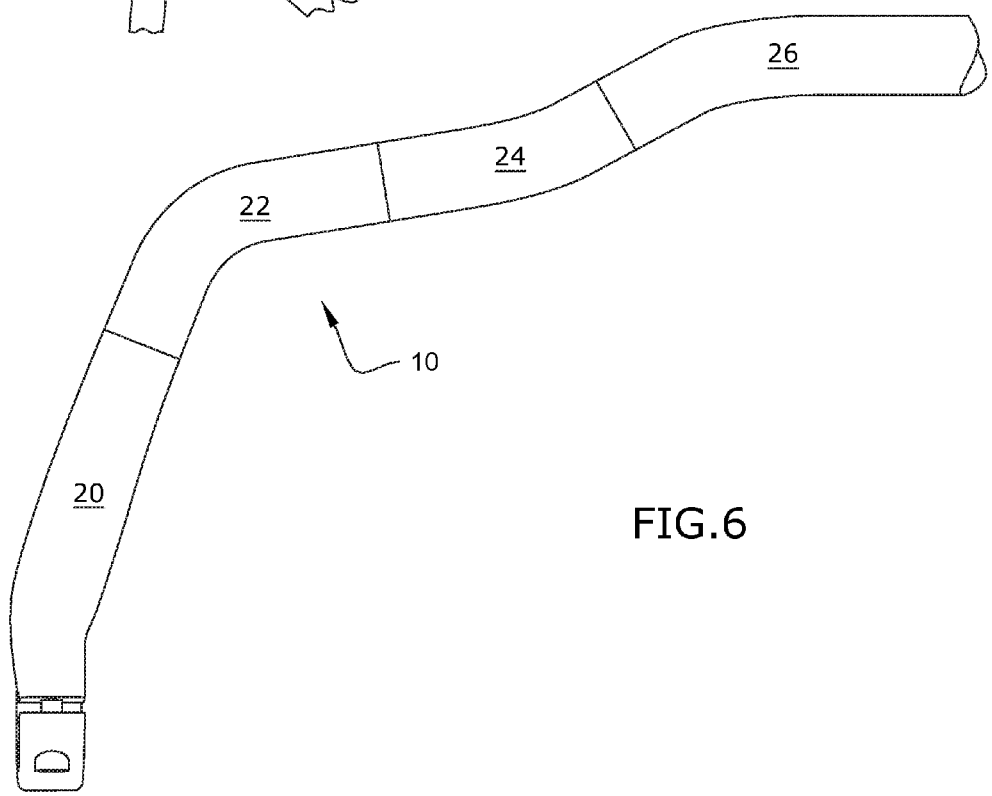
FIG. 6 depicts a schematic view of certain embodiments of the handlebar attachment.
Figure 7:
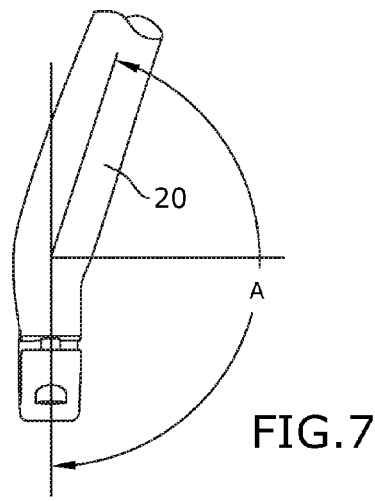
FIG. 7 depicts a schematic view of certain embodiments of the handlebar attachment illustrating a first bent section.
Figure 9:
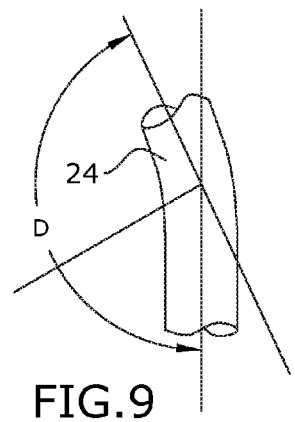
FIG. 9 depicts a schematic view of certain embodiments of the handlebar attachment illustrating a third bent section.
Figure 8:
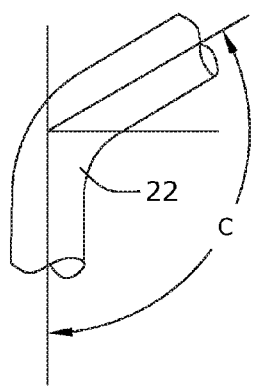
FIG. 8 depicts a schematic view of certain embodiments of the handlebar attachment illustrating a second bent section.
Figure 10:
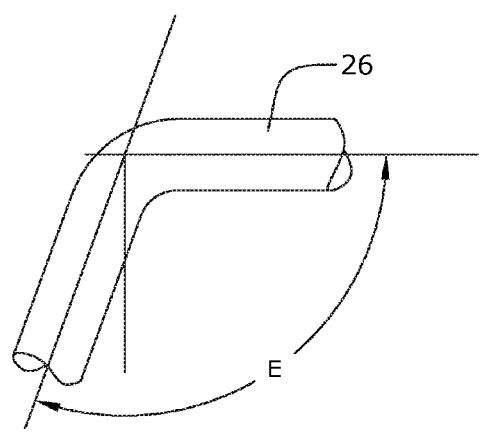
FIG. 10 depicts a schematic view of certain embodiments of the handlebar attachment illustrating a fourth bent section.

Handlebar attachment 10 comprises a pair of symmetric halves that are continuously connected together. As depicted in FIG. 6, each symmetric half of handlebar attachment 10 comprises a plurality of bent sections continuously connected together including first bent section 20, second bent section 22, third bent section 24 and fourth bent section 26. As depicted in FIG. 7, first bent section 20 comprises a first end central axis and a second end central axis that form an angle A, which is approximately 162 degrees in a preferred embodiment. As depicted in FIG. 8, second bent section 22 comprises a first end central axis and a second end central axis that form an angle C, which is approximately 130 degrees in a preferred embodiment. As depicted in FIG. 9, third bent section 24 comprises a first end central axis and a second end central axis that form an angle D, which is approximately 155 degrees in a preferred embodiment. As depicted in FIG. 10, fourth bent section 26 comprises a first end central axis and a second end central axis that form an angle E, which is approximately 110 degrees in a preferred embodiment.

Since the bent sections of handlebar attachment 10 are continuously connected together, end central axes of adjacent bent sections are aligned with each other. For example, the second end central axis of first bent section 20 is aligned with the first end central axis of second bent section 22, the second end central axis of second bent section 22 is aligned with the first end central axis of third bent section 24, and the second end central axis of third bent section 24 is aligned with the first end central axis of fourth bent section 26.

In operation, handlebar attachment 10 is pivotably adjusted to a desired position relative to flat handlebar 18 to accommodate the rider's size and riding style. Handlebar attachment 10 is locked into the desired position. The seated rider on the bicycle can pedal and maneuver the bicycle as normal. The rider's hands are placed on any bent sections of handlebar attachment 10. This enhances rider comfort and safety. For example, the rider may place his/her hands on a particular bent section of handlebar attachment 10 that is within a comfortable reach and/or closely situated to the bicycle's hand brake system. In an alternative embodiment, handlebar attachment 10 also serves as a mounting surface for a variety of accessories including, but not limited to, rear view mirrors and lighting units such as turn signal lights, strobe lights, running lights, or the like.

It shall be appreciated that the components of handlebar attachment 10 described in several embodiments herein may comprise any alternative known materials in the field and be of any color, size and/or dimensions. It shall be appreciated that the components of handlebar attachment 10 described herein may be manufactured and assembled using any known techniques in the field.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A handlebar attachment for use with an existing handlebar of a bicycle, the handlebar attachment comprising a curvature to provide a user with different hand placement positions to enhance rider comfort and safety, the handlebar attachment comprising:

a bar member pivotably mounted to the existing handlebar of the bicycle, the bar member comprising a pair of symmetric halves continuously connected together, each symmetric half of the pair of symmetric halves comprising a first bent section continuously connected to a second bent section continuously connected to a third bent section continuously connected to a fourth bent section, wherein the bar member is configured to pivotably adjust relative to the existing handlebar to one of a plurality of locking positions to permit hands of the user to rest on any of the first, second, third or fourth bent sections of the symmetric halves, wherein the fourth bent section comprises a first end central axis and a second end central axis, the first end central axis and the second end central axis of the fourth bent section forming an angle of approximately 110 degrees.

2. The handlebar attachment of claim 1, wherein the bar member is a tubular member.

3. The handlebar attachment of claim 2, wherein each symmetric half comprises an end clamp detachably coupled to the existing handlebar.

4. The handlebar attachment of claim 3, wherein the first bent section comprises a first end central axis and a second end central axis, wherein the first end central axis and the second end central axis of the first bent section form a first angle of approximately 162 degrees.

5. The handlebar attachment of claim 4, wherein the second bent section comprises a first end central axis and a second end central axis, wherein the first end central axis and the second end central axis of the second bent section form a second angle of approximately 130 degrees.

6. The handlebar attachment of claim 5, wherein the third bent section comprises a first end central axis and a second end central axis, wherein the first end central axis and the second end central axis of the third bent section form a third angle of approximately 155 degrees.

7. A handlebar attachment for use with an existing handlebar of a bicycle, the handlebar attachment comprising a curvature to provide a user with different hand placement positions to enhance rider comfort and safety, the handlebar attachment comprising:

a bar member pivotably mounted to the existing handlebar of the bicycle, the bar member comprising a pair of symmetric halves continuously connected together, each symmetric half of the pair of symmetric halves comprising a first bent section continuously connected to a second bent section continuously connected to a third bent section continuously connected to a fourth bent section, wherein the bar member is configured to pivotably adjust relative to the existing handlebar to one of a plurality of locking positions to permit hands of the user to rest on any of the first, second, third or fourth bent sections of the symmetric halves, wherein the third bent section comprises a first end central axis and a second end central axis, the first end central axis and the second end central axis of the third bent section forming a third bent section angle of approximately 155 degrees, wherein the fourth bent section comprises a first end central axis and a second end central axis, the first end central axis and the second end central axis of the fourth bent section forming a fourth bent section angle of approximately 110 degrees.

* * * * *